United States Patent [19]
Fukui

[11] Patent Number: 5,295,466
[45] Date of Patent: Mar. 22, 1994

[54] KNOCK SUPPRESSION APPARATUS FOR AN INTERNAL COMBUSTION ENGINE

[75] Inventor: Wataru Fukui, Himeji, Japan

[73] Assignee: Mitsubishi Denki Kabushiki Kaisha, Tokyo, Japan

[21] Appl. No.: 75,096

[22] Filed: Jun. 11, 1993

[30] Foreign Application Priority Data

Jun. 15, 1992 [JP] Japan .................................. 4-154999

[51] Int. Cl.⁵ ............................................. F02P 5/15
[52] U.S. Cl. .................................................. 123/425
[58] Field of Search ............... 123/425, 435, 422, 423, 123/426

[56] References Cited

U.S. PATENT DOCUMENTS

| | | | |
|---|---|---|---|
| 4,612,902 | 9/1986 | Abe et al. | 123/425 |
| 4,631,680 | 12/1986 | Korb et al. | 123/425 X |
| 4,788,957 | 12/1988 | Komurasaki | 123/425 |
| 4,790,281 | 12/1988 | Mieno et al. | 123/425 |
| 4,819,171 | 4/1989 | Morita | 123/425 X |
| 4,844,027 | 7/1989 | Nakamura | 123/425 |
| 4,858,580 | 8/1989 | Kamise et al. | 123/425 |
| 4,899,710 | 2/1990 | Takahashi | 123/425 |
| 4,945,876 | 8/1990 | Nakaniwa | 123/425 |
| 4,971,007 | 11/1990 | Gopp et al. | 123/425 |
| 5,235,953 | 8/1993 | Kato et al. | 123/425 |

Primary Examiner—Willis R. Wolfe
Attorney, Agent, or Firm—Sughrue, Mion, Zinn, Macpeak and Seas

[57] ABSTRACT

A knock suppressing apparatus for an internal combustion engine includes knock sensing means for sensing knocking of an engine and lag angle calculating means responsive to the knock sensing means for calculating a lag angle when knocking is sensed. A basic ignition timing for the engine is calculated by a basic ignition timing calculating means based on an operating condition of the engine, and a load sensing means senses a transition of a load of the engine between a light load region and a heavy load region. A weighting means responsive to the load sensing means produces a weighting factor multiplies the lag angle by the weighting factor to obtain a corrected lag angle and changes the weighting factor, when the load sensing means senses a transition of the load, from its value prior to the transition to a new value in a plurality of steps. A final ignition timing calculating means calculates a final ignition timing for the engine based on the basic ignition timing and the corrected lag angle.

11 Claims, 2 Drawing Sheets

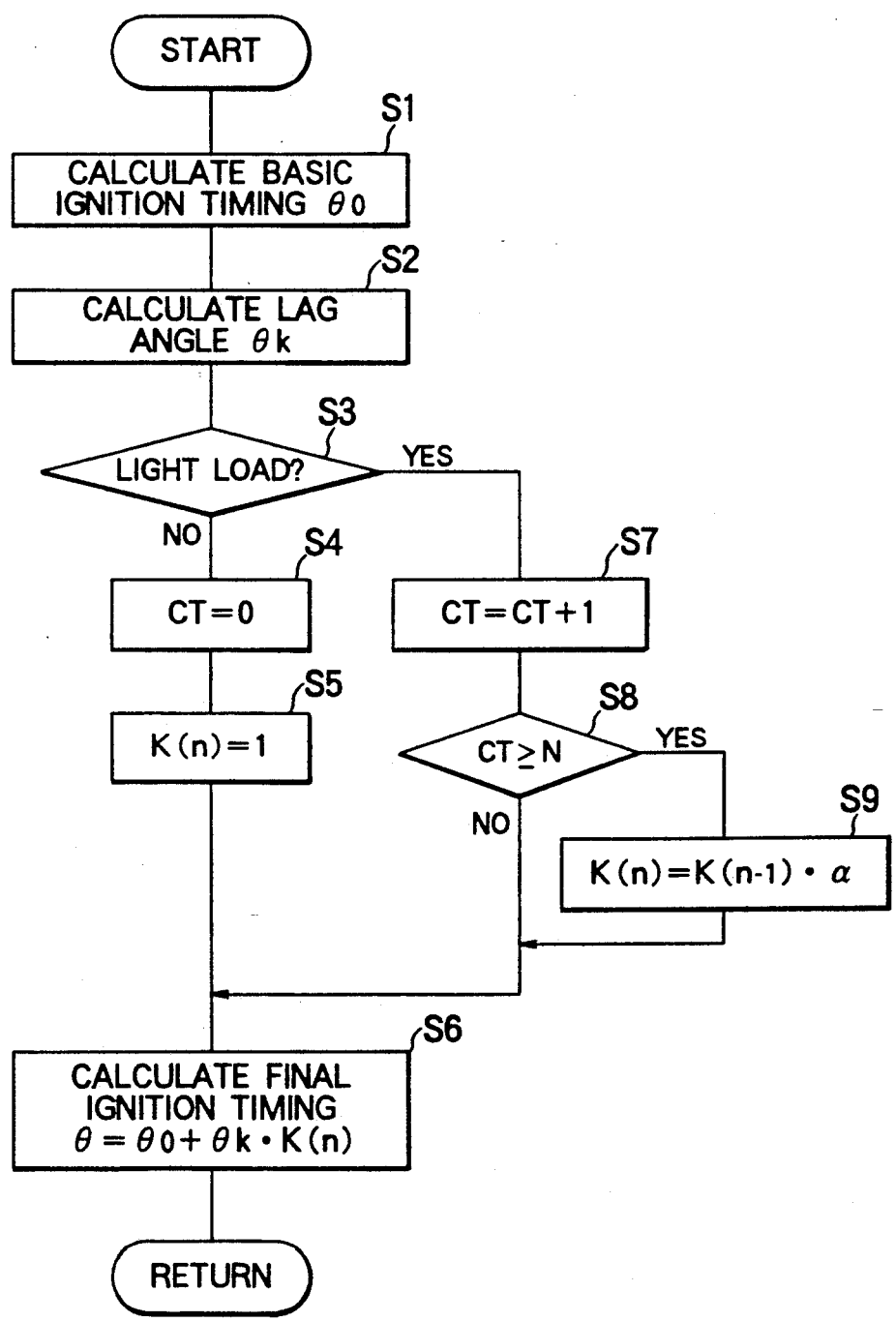

KNOCK SUPPRESSION APPARATUS FOR AN INTERNAL COMBUSTION ENGINE

BACKGROUND OF THE INVENTION

This invention relates to a knock suppression apparatus for an internal combustion engine, such as an automotive engine. More particularly, it relates to a knock suppression apparatus which can prevent fluctuation of the ignition timing of an engine when the engine is operating near the border between a light load and a heavy load region.

Engine knocking is a form of abnormal engine vibration which occurs when the ignition timing of an internal combustion engine is improper. The occurrence of knocking in an engine not only decreases the ride comfort and worsens the fuel economy of the vehicle in which the engine is installed, but it can also damage the engine. Therefore, automotive engines are typically equipped with knock suppression devices which detect the occurrence of knocking and then adjust the ignition timing in the lag angle direction until the knocking stops.

In one form of conventional knock suppression apparatus for an engine, a basic ignition timing for the engine is calculated based on engine operating conditions such as the engine rotational speed. In the absence of knocking, ignition is carried out using this basic ignition timing. When knocking is sensed, the basic ignition timing is corrected in the lag angle direction by a correction factor to obtain a corrected ignition timing, and ignition is carried out using the corrected ignition timing.

Various vibrations due to causes other than knocking are produced during the operation of an engine, and there is the possibility of these vibrations being mistakenly sensed as knocking vibrations, especially when the engine is operating in a light load region. Therefore, in order to prevent the ignition timing from being unnecessarily retarded due to mistaken sensing of knocking, in some conventional knocking suppression devices, the correction factor is set to zero when it is sensed that the engine has entered a light load region so that the engine will operate with the basic ignition timing, since there is a low probability of knocking occurring in this region.

However, if the engine load is fluctuating between a light load region and a heavy load region, the correction factor will be caused to abruptly switch between a zero and nonzero value, and hunting will take place, which is undesirable.

Furthermore, if it is erroneously sensed that the engine has entered a light load region due to signal noise, for example, immediately setting the correction factor to zero will cause the ignition timing to immediately revert to the basic ignition timing. Therefore, if knocking was taking place at the time that the correction factor was set to zero, the knocking will not be suppressed, and engine damage may occur.

SUMMARY OF THE INVENTION

Accordingly, it is an object of the present invention to provide a knock suppression apparatus for an internal combustion engine which can prevent hunting of the ignition timing for the engine when the engine is operating near the border of a light load and a heavy load region.

It is another object of the present invention to provide a knock suppression apparatus which can prevent engine damage due to knocking when erroneous sensing of a light load condition takes place.

It is yet another object of the present invention to provide a method for suppressing knocking in an internal combustion engine.

A knock suppressing apparatus for an internal combustion engine according to the present invention includes knock sensing means for sensing knocking of an engine and lag angle calculating means responsive to the knock sensing means for calculating a lag angle for retarding the ignition timing of the engine when knocking is sensed. A basic ignition timing calculating means calculates a basic ignition timing for the engine based on an operating condition of the engine, and a load sensing means senses a transition of a load of the engine between a light load region and a heavy load region. A weighting means responsive to the load sensing means produces a weighting factor multiplies the lag angle by the weighting factor to obtain a corrected lag angle and changes the weighting factor, when the load sensing means senses a transition of the load, from its value prior to the transition to a new value in a plurality of steps. A final ignition timing calculating means calculates a final ignition timing for the engine based on the basic ignition timing and the corrected lag angle.

Preferably, the weighting means does not change the value of the weighting factor until a prescribed length of time has passed since a transition in the load from one region to another without a subsequent transition taking place.

A knocking suppression method according to the present invention includes sensing knocking of an engine, sensing a transition of a load on the engine between first and second load regions, calculating a basic ignition timing based on an operating condition of the engine, calculating a lag angle for the engine when knocking is sensed, calculating a weighting factor and multiplying the lag angle by the weighting factor to obtain a corrected lag angle, changing the weighting factor upon sensing of a load transition from its value prior to the transition to a new value in a plurality of steps, calculating a final ignition timing for the engine based on the basic ignition timing and the corrected lag angle, and controlling the engine according to the final ignition timing.

BRIEF DESCRIPTION OF THE DRAWINGS

FIG. 2 is a flow chart illustrating an example of a routine which can be performed by the embodiment of FIG. 1.

DESCRIPTION OF THE PREFERRED EMBODIMENTS

Figure 1:
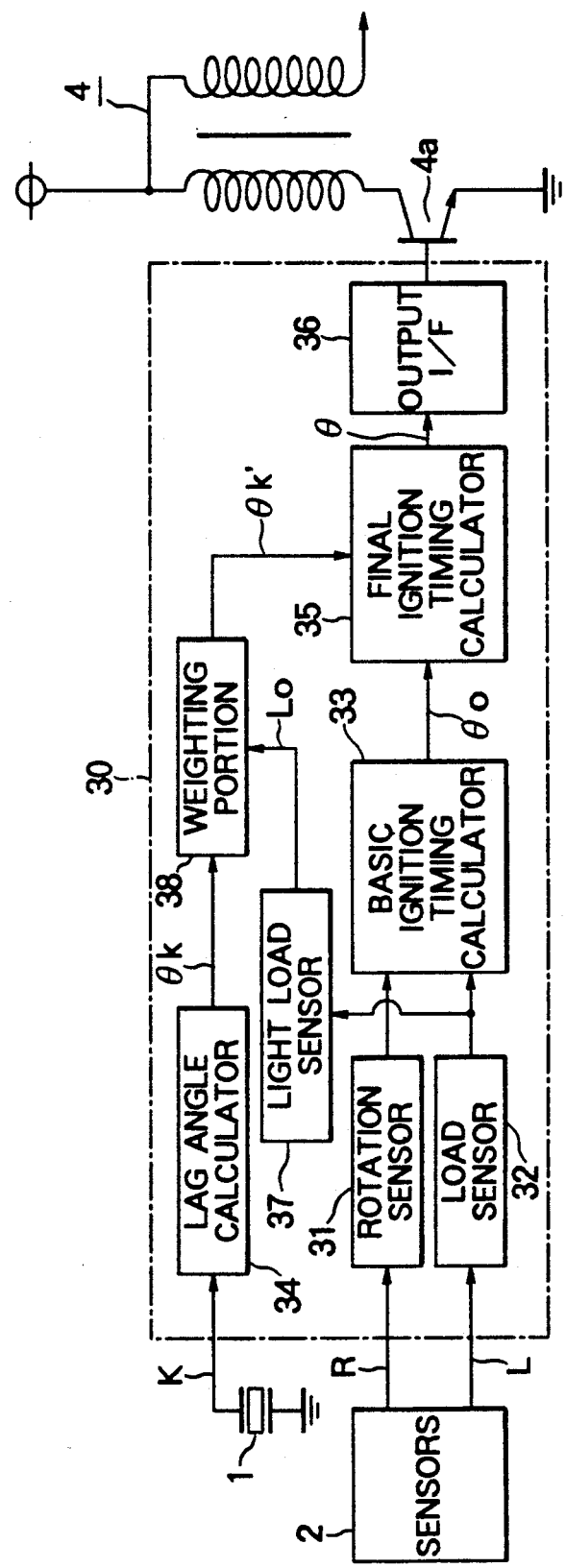
FIG. 1 is a block diagram of an embodiment of a knock suppression apparatus according to the present invention.

A preferred embodiment of the present invention will be described while referring to the accompanying drawings. FIG. 1 is a schematic block diagram of one embodiment for use with an unillustrated internal combustion engine, such as an automotive engine having one or more cylinders. Knocking of the engine is sensed by one or more conventional knock sensor 1 mounted on the engine. In the present embodiment, the knock sensor 1 is a device such as an accelerometer which generates a knock signal K indicating mechanical vibrations of the engine. Alternatively, the knock sensor 1 could be a device which senses the pressures within the cylinders of the engine. The knock signal K from the knock sensor 1 is input to an electronic controller 30. One or more conventional sensors 2 detect various operating conditions of the engine and provide the controller 30 with corresponding signals indicating the sensed conditions. In the present embodiment, the signals generated by the sensors 2 include a rotation signal R from which the rotational speed of the engine can be determined and a load signal L which is indicative of the engine load. An example of the rotation signal R is a series of pulses generated at prescribed crankshaft angles by a conventional crank angle sensor for sensing rotation of the crankshaft or the camshaft of the engine. The load signal L can be any signal which can be used to determine when the engine is operating in a light load region in which knocking is unlikely to occur. for example, it could be a signal generated by a throttle opening sensor indicating the degree of opening of a throttle valve for the engine, or it could be a signal generated by an air flow sensor indicating the air flow rate into the engine.

The controller 30 is conceptually illustrated as comprising individual elements 31-38, but alternatively, the controller 30 may comprise a microcomputer or the like which performs the functions of these elements by means of a program.

The rotation signal R and the load signal L are respectively input to a rotation sensor 31 and a load sensor 32 of the controller 30. The rotation sensor 31 determines the engine rotational speed from the rotation signal R and generates a corresponding output signal, and the load sensor 32 determines the engine load from the load signal L and generates a corresponding output signal. The output signals from the rotation sensor 31 and the load sensor 32 are provided to a basic ignition timing calculator 33, which calculates a basic ignition timing $\theta_o$ for the engine based on the present operating conditions, such as the rotational speed, the engine load, or other conditions. Typically, the basic ignition timing calculator will include a memory in which is stored a map giving suitable values of the basic ignition timing $\theta_o$ as a function of engine operating conditions. The basic ignition timing $\theta_o$ corresponds to the length of time from a reference position of the engine until ignition of a cylinder of the engine. Algorithms for use in calculating a basic ignition timing on the basis of engine operating conditions are well known to those skilled in the art, and any suitable algorithm can be employed.

The knock signal K from the knock sensor 1 is provided to a lag angle calculator 34 of the controller 30, which calculates a correction factor in the form of a lag angle $\theta_k$ for correcting the basic ignition timing $\theta_o$ to compensate for knocking. Formulas for calculating a lag angle $\theta_k$ are well known in the art. When no knocking is taking place, the lag angle $\theta_k$ calculated by the lag angle calculator 34 will be zero. When the vibrations indicated by the knock signal K rise above a prescribed level, it is determined that knocking is taking place, so the lag angle $\theta_k$ is set to a nonzero value, such as 3° of crank angle, and the basic ignition timing $\theta_o$ is corrected by this amount in the lag angle direction. If knocking continues to take place, the lag angle $\theta_k$ is gradually increased in increments until knocking is suppressed. If the lag angle $\theta_k$ reaches a predetermined maximum value, such as 10° of crank angle, it is determined that mistaken detection of knocking has occurred, and no further increase of the lag angle $\theta_k$ takes place.

The output signal from the load sensor 32 is provided to a light load sensor 37, which generates a light load signal $L_o$ having a value indicating whether the engine load indicated by the load sensor 32 is in a light load region. For example, the light load signal $L_o$ could have a zero value when the engine is in a heavy load region and a predetermined nonzero value when the engine enters a light load region.

The signal from the lag angle calculator 34 indicating the lag angle $\theta_k$ and the light load signal $L_o$ from the light load sensor 37 are provided to a weigting portion 38, which multiplies the lag angle $\theta_k$ by a weighting factor K to obtain a corrected lag angle $\theta_k'$. The value of the weighting factor K depends on the value of the light load signal $L_o$. In general, if the light load signal $L_o$ indicates that the engine has been operating in a heavy load region for at least a prescribed length of time, the weighting factor K has a value of 1. If the light load signal $L_o$ indicates that the engine is operating in a light load region, the weighting factor K has a value from 0 to 1, with the value gradually decreasing towards 0 the longer a light load condition has continued. As a result, the value of the corrected lag angle $\theta_k'$ gradually decreases from $\theta_k$ towards 0 as a light load condition continues.

Preferably, the weighting portion 38 does not vary the weighting factor K from a value of 1 until a light load condition as indicated by the light load signal $L_0$ has continued for a prescribed length of time, so that if the load signal L momentarily gives an erroneous indication of a light load, there will be no immediate effect on the final ignition timing.

The basic ignition timing $\theta_o$ and the corrected lag angle $\theta_k'$ are input to a final ignition timing calculator 35, which corrects the basic ignition timing $\theta_o$ by the corrected lag angle $\theta_k'$ to obtain a final ignition timing $\theta$. Namely, the basic ignition timing $\theta_o$ is retarded by the corrected lag angle $\theta_k'$. A signal indicating the final ignition timing $\theta$ is provided to an output interface 36, which controls a drive transistor 4a connected to an ignition coil 4 so that firing of an unillustrated spark plug connected to the ignition coil 4 will take place with the final ignition timing $\theta$.

FIG. 2 is a flow chart illustrating an example of a routine performed at prescribed intervals during the operation of the embodiment of FIG. 1 to control the ignition timing. In the flow chart, CT is a counter value which is used to measure the length of time a light load condition indicated by the light load signal $L_o$ has continued. N is the value of the counter value CT when a light load condition has continued for a predetermined period (such as 1 second). N is compared with the counter value CT to determine whether a light load condition has continued long enough for the weighting portion 38 to begin correcting the lag angle $\theta_k$. K(n) represents the current value of the weighting factor K, and K(n−1) represents the previous value. $\alpha$ is a coefficient having a value between 0 and 1.

In Step S1 of FIG. 2, the basic ignition timing calculator 33 calculates the basic ignition timing $\theta_o$ based on the rotational speed and the load as determined by the rotation sensor 31 and the load sensor 32. In Step S2, the lag angle calculator 34 calculates a lag angle $\theta_k$ based on whether the knock signal K indicates that knocking is taking place. In Step S3, the light load sensor 37 determines from the output signal of the load sensor 32 whether the engine is operating at a light load. If a light load condition does not exist, then in Step S4, the weighting portion 38 sets the counter value CT to 0, and in Step S5, it sets the weighting factor K(n) to 1. It then calculates the corrected lag angle $\theta_k' = \theta_k \times K(n)$. In Step S6, the final ignition timing calculator 35 calculates the final ignition timing $\theta$ from the formula $$\begin{aligned} \theta &= \theta_0 + \theta_k' \\ &= \theta_0 + \theta_k \times K(n). \end{aligned}$$

At this time, K(n) = 1, so $\theta = \theta_o + \theta_k$, and the basic ignition timing $\theta_o$ is corrected by the full amount of the lag angle $\theta_k$.

On the other hand, if the light load sensor 37 determines in Step S3 that the engine is operating under a light load, the light load signal $L_o$ is set to a value indicating a light load, and in Step S7, the weighting portion 38 increments the counter value CT by 1. In Step S8, the weighting portion determines whether a light load condition has continued for the predetermined length of time (which ranges from several ten msec. to several hundred msec.) by comparing the counter value CT with N. If CT is less than N, then it is determined that a light load condition has continued for only a short period, so the routine advances to Step S6 without changing the value of the weighting factor K(n). However, if in Step S8 it is determined that CT is greater than or equal to N, then in Step S9, the weighting factor K(n) is decreased by setting it equal to its previous value K(n−1) multiplied by coefficient $\alpha$, and then in Step S6, the final ignition timing calculator 35 calculates the final ignition timing $\theta$ using the new value of K(n).

For example, if $\alpha = \frac{1}{2}$, the first time that Step S9 is performed, K(n) will be set equal to K(n−1)×0.5 = 1×0.5, and in Step S6, the final ignition timing $\theta$ will be set equal to $\theta_o + 0.5\theta_k$. The next time the routine is performed, if a light load condition continues, then in Step S9, K(n) will be set equal to K(n−1)×0.5 = 0.5×0.5 = 0.25, and in Step S6, the final ignition timing $\theta$ will be set equal to $\theta_o + 0.25\theta_k$. Thus, as the light load condition continues, the final ignition timing is gradually decreased in a plurality of steps towards the basic ignition timing $\theta_o$.

Unless a light load condition continues for at least a prescribed length of time determined by the value of N, the final ignition timing $\theta$ is not changed from its value prior to a transition from a heavy load condition to a light load condition, and if the light load condition continues for at least the prescribed length of time, the corrected lag angle $\theta_k'$ is gradually decreased from $\theta_k$ towards 0 in a stepwise manner. As a result, the final ignition timing $\theta$ will be stable, and hunting will not take place.

Furthermore, because the ignition timing is not varied until after the engine load has been in a light load region for the prescribed length of time, momentary erroneous detection of a light load condition by the light load sensor 37 due to electrical noise will not affect the ignition timing, and the ignition timing can remain at a value suitable for suppressing knocking, thereby preventing damage to the engine.

If the engine changes from a light load condition to a heavy load condition, the light load signal $L_o$ will take on a value indicating that a light load condition no longer exists. Therefore, in Step S4, the counter CT will be set to 0, and in Step S5, the weighting portion will immediately set the weighting factor K(n) equal to 1, so in Step S6, the ignition timing will be set equal to $\theta_o + \theta_k$.

Alternatively, upon a change from a light load condition to a heavy load condition, instead of increasing the weighting factor K(n) to 1 in a single step, the weighting portion 38 can gradually increase the weighting factor K(n) towards a value of 1 in a plurality of small steps spread out over a plurality of passes through the routine. This will produce a gradual change in the final ignition timing $\theta$ and provide more stable operation.

In the routine of FIG. 2, the weighting factor is decreased from 1 towards zero by a plurality of steps of unequal size. Namely, in subsequent passes through Step S9, the weighting factor K(n) has the values 1, $\frac{1}{2}$, $\frac{1}{4}$, $\frac{1}{8}$, etc. However, it is also possible to decrease the weighting factor K(n) by a plurality of steps of equal size.

What is claimed is:

1. A knock suppression apparatus for an internal combustion engine comprising:

knock sensing means for sensing knocking of an engine;

load sensing means for sensing a transition of a load of the engine between a light load region and a heavy load region;

basic ignition timing calculating means for calculating a basic ignition timing based on an operating condition of the engine;

lag angle calculating means responsive to the knock sensing means for calculating a lag angle when knocking is sensed;

weighting means responsive to the load sensing means for producing a weighting factor and multiplying the lag angle by the weighting factor to obtain a corrected lag angle and for changing the weighting factor, when the load sensing means senses a transition of the load, from its value prior to the transition to a new value in a plurality of steps;

final ignition timing calculating means for calculating a final ignition timing for the engine based on the basic ignition timing and the corrected lag angle; and means for controlling the engine according to the final ignition timing.

2. An apparatus as claimed in claim 1 wherein the correcting means begins changing the weighting factor only when a prescribed length of time has passed since the transition without a subsequent transition occurring.

3. An apparatus as claimed in claim 2 wherein the prescribed length of time is at least 1 second.

4. An apparatus as claimed in claim 1 wherein the weighting means decreases the weighting factor upon a transition from a heavy load region to a light load region.

5. An apparatus as claimed in claim 1 wherein the weighting means increases the weighting factor upon a transition from a light load region to a heavy load region.

6. An apparatus as claimed in claim 1 wherein each of the steps is smaller than the value of the weighting factor prior to the transition.

7. An apparatus as claimed in claim 1 wherein the steps are of unequal size.

8. A knock suppression apparatus for an internal combustion engine comprising:

knock sensing means for sensing knocking of an engine;

light load sensing means for sensing when the engine is operating under a light load;

basic ignition timing calculating means for calculating a basic ignition timing based on an operating condition of the engine;

lag angle calculating means responsive to the knock sensing means for calculating a lag angle when knocking is sensed;

lag angle correcting means responsive to the light load sensing means for decreasing the lag angle from an initial value calculated by the lag angle calculating means to a new value in a plurality of steps to provide a corrected lag angle when the light load sensing means senses that the engine is operating under a light load; and final ignition timing calculating means for calculating a final ignition timing for the engine based on the basic ignition timing and the corrected lag angle.

9. An apparatus as claimed in claim 8 wherein the lag angle correcting means decreases the lag angle in accordance with the length of time a light load condition has continued.

10. A knock suppression apparatus for an internal combustion engine comprising:

knock sensing means for sensing knocking of an engine;

load sensing means for sensing a transition of a load of the engine between a light load region and a heavy load region;

basic ignition timing calculating means for calculating a basic ignition timing based on an operating condition of the engine;

lag angle calculating means responsive to the knock sensing means for calculating a lag angle when knocking is sensed;

weighting means responsive to the load sensing means for producing a weighting factor and multiplying the lag angle by the weighting factor to obtain a corrected lag angle and for changing the weighting factor from its value prior to the transition to a new value no earlier than 1 second after the transition;

final ignition timing calculating means for calculating a final ignition timing for the engine based on the basic ignition timing and the corrected lag angle; and means for controlling the engine according to the final ignition timing.

11. A knocking suppression method for an internal combustion engine comprising:

sensing knocking of an engine;

sensing a transition of a load on the engine between first and second load regions;

calculating a basic ignition timing based on an operating condition of the engine;

calculating a lag angle for the engine when knocking is sensed;

calculating a weighting factor and multiplying the lag angle by the weighting factor to obtain a corrected lag angle;

changing the weighting factor upon sensing of a load transition from its value prior to the transition to a new value in a plurality of steps;

calculating a final ignition timing for the engine based on the basic ignition timing and the corrected lag angle; and controlling the engine according to the final ignition timing.

* * * * *